United States Patent Office 3,525,436
Patented Aug. 25, 1970

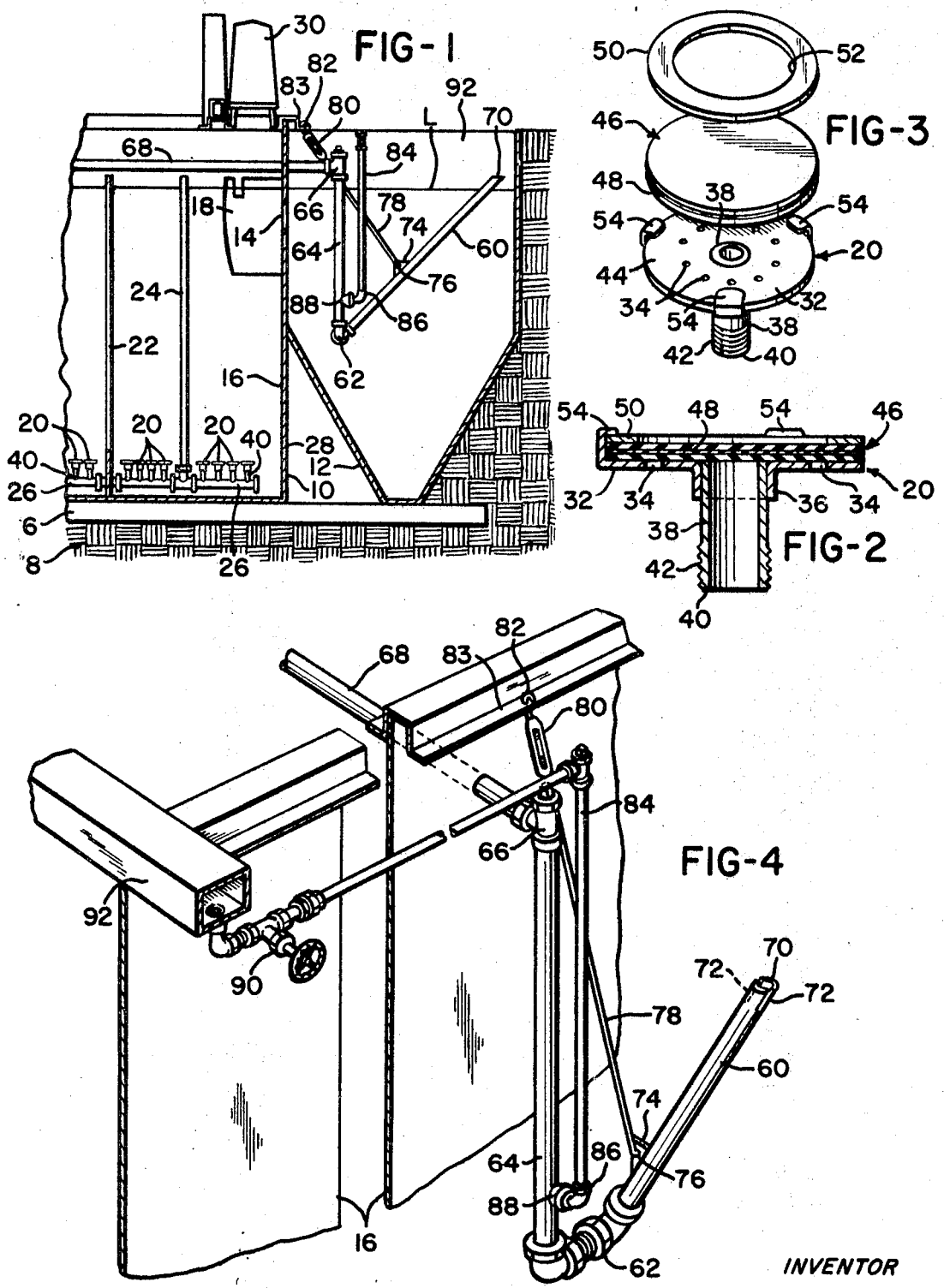

3,525,436
SEWAGE TREATMENT PLANT
Donald J. Reckers, Cincinnati, Ohio, assignor to Pollution Control, Inc., Cincinnati, Ohio, a corporation of Ohio
Filed Oct. 2, 1968, Ser. No. 764,547
Int. Cl. B01d 21/24; C02c 1/12
U.S. Cl. 210—220                                   21 Claims

ABSTRACT OF THE DISCLOSURE

The sewage treatment plant incorporates a skimmer which is quickly adjustable to changes in the level of liquid in a clarifier receptacle, without subjecting an attendant to exposure to sewage. A novel form of aeration nozzle disperses air bubbles in sewage, through apertures which are closed automatically by a flexible diaphragm to exclude solids whenever the supply of air is terminated.

---

This invention relates to improvements in a sewage treatment plant of the type which involves aeration of the sewage in a fluid state, and the skimming of floating debris from the fluid mass undergoing treatment.

The use of air nozzle for aerating sewage is commonplace, and has been generally acceptable in practice although clogging of the nozzles has always presented a vexatious problem requiring solution. Likewise, the skimming of floating debris from the liquid of the clarifier section of the plant has been practiced more or less successfully, but under conditions which made the skimming operation difficult and unpleasant for the plant attendant.

One of the objects of the present invention is to enhance the sewage treatment plant operation by providing aeration nozzles which will not clog or fail in operation, notwithstanding the presence of sewage solids in the immediate vicinity thereof.

Another object of the invention is to provide an improved aeration nozzle construction which is highly durable, efficient, foolproof, and inexpensive to manufacture; and further, the nozzle is constructed to effect a positive closure, and the elimination of back-surge of sewage into the air supply system, thereby avoiding the usual need for frequent nozzle cleaning or replacement.

Another object is to provide a nozzle of the character stated, which is self-cleaning in use.

Another object of the invention is to enhance the operation of an aerobic sewage treatment plant, by providing a simple and inexpensive skimmer and adjusting means therefor, which facilitates and expedites the work of the plant attendant and enables the plant to be readily accommodated to varying conditions of sewage input and effluent discharge.

A further object of the invention is to so construct and locate the skimmer adjusting means, that an attendant may quickly and easily adjust the skimmer operation without having physical contact with, or long exposure to, the sewage controlled by the skimmer.

The foregoing and other objects are attained by the means described herein and illustrated upon the accompanying drawing, in which:

FIG. 1 is a fragmentary vertical cross-section of a sewage treatment plant having an aeration section and a clarifier section equipped with the means of the present invention.

FIG. 2 is a vertical cross-section of an aeration nozzle embodying the teachings of the present invention.

FIG. 3 is an exploded perspective view of the aeration nozzle.

FIG. 4 is a fragmentary perspective view of a portion of the clarifier section of the treatment plant, detailing a skimmer and adjusting means therefor.

The sewage treatment plant herein disclosed is one of the general character disclosed in my copending application Ser. No. 693,520, filed Dec. 26, 1967, and now U.S. Pat. No. 3,438,499, issued Apr. 15, 1969. The plant includes a foundation slab 6 supported in earth 8, and upon which is placed a large open-topped aeration section or tank 10 having at one end thereof an open-topped clarifier section or receptacle 12 fixed or assembled thereon and resting upon the same slab 6. An opening 14 in the common end wall 16 permits flow of liquid between tank 10 and receptacle 12, past a baffle plate 18 located preferably within tank 10.

Treatment of sewage within tank 10 includes aeration thereof by means of a series of air nozzles 20, and the control of circulation by means of baffles 22 which retard the flow of sewage toward the clarifier receptacle 12. Air under pressure is supplied to nozzles 20 by way of an air supply pipe 24 and a series of manifold pipes 26. Pipes 26 extend lengthwise of tank 10, and in close proximity to one of its side walls 28, so that rising air bubbles from the nozzles will induce a circulation of liquid sewage upwardly along side wall 28 and downwardly along the opposite side wall (not shown), of tank 10. A compressor unit 30, or other source of air under pressure, may supply air to pipe 24 and nozzles 20.

Attention is now directed to the details of construction of the aeration nozzles, as depicted by FIGS. 2 and 3. The nozzle comprises a disc or flat plate 32, shown as circular by way of example, and having formed therein a plurality of air discharge holes or apertures 34 arranged in a circle at equal distances from the center of the plate or disc. At its center, the plate or disc 32 may be provided with a hollow hub 36 in which may be welded, force-fitted, or otherwise suitably fixed, a tubular nipple 38 having a free end portion 40. End portion 40 is adapted to connect with a manifold pipe 26, as by means of screw threads 42 or equivalent mounting means furnishing a connection which, by preference, is detachable.

Upon the flat or smooth upper face 44 of plate 32 is placed, in flatwise contact, a substantially coinciding flexible diaphragm 46, which may cover all the apertures and the hub opening of plate 3. A retaining ring 50 having an enlarged central opening 52 overlies the diaphragm at its outer marginal edge, and presses the diaphragm margin against the plate 32.

Means is provided for holding the retaining ring 50 and the diaphragm in position upon plate 32, and such means may comprise a plurality of ring-engaging lugs or hooks 54 to normally overlie the ring according to FIG. 2. The lugs may be formed integrally with plate or disc 32. A diaphragm such as 46, and ring 50, may be applied to or removed from plate 32 by simply bending one or more lugs 54 outwardly to a position of non-obstruction. Normally, the lugs overlie ring 50 and marginal portions of the diaphragm, to provide an assembled unit.

The several parts of the aeration nozzle, exclusive of the diaphragm, may be formed of any suitable material, a non-corrosive metal being preferred. Examples of such metals are stainless steel, brass, bronze, and aluminum.

The diaphragm 46 should be formed of a flexible rubber-like material which is substantially impervious to water and capable of sealing the plate apertures 34 when no air pressure is present in nipple 38. A highly satisfactory material for the diaphragm is neoprene, with an internal lamination or reinforcement 48 of nylon cloth or equivalent fabric, which serves to oppose any liability of the diaphragm to assume a condition of permanent distortion when distended by air pressure from nipple 38 acting against the underface of the diaphragm in seeking release through apertures 34.

In the light of the foregoing explanation, it will be understood that air under pressure supplied to the aeration nozzles by way of manifold pipes 26 and the nipples 38, will act to flex the diaphragm 46 at its center, so that the air may be released through apertures 34 at the underside of plate 32, to ascend as bubbles through liquid sewage which stands at a high level in tank 10. The feeding of air to the nozzles preferably is intermittent in practice, so that repeated flexing of diaphragm 46 by air fed thereto discourages any tendency of sewage solids to build up on the exposed upper face of the diaphragm.

When the flow of air to the nozzle is terminated, the flexible and resiliest diaphragm immediately closes upon all the discharge apertures 34, to prevent back-surge of sewage into the nipple 38 and the air supply manifold 26, thereby ensuring the nozzle structure and its air supply against obstruction or clogging by solids in the sewage. Flexation of the diaphragm from time to time dislodges any accumulations of solids occurring in the vicinity thereof, and disposition of the air discharge apertures 34 to a hooded position beneath the diaphragm reduces the likelihood aperture clogging to a practical minimum.

The use of aeration nozzles of the kind referred to above, eliminates the customary frequent servicing or replacement of clogged nozzles, and enables the plant to remain in operating condition without frequent interruptions, for extended periods of time. The expense and annoyance of frequent servicing are reduced to a minimum, so that great efficiency in operation of the plant is accomplished.

With reference now to FIG. 4, the numeral 60 denotes a skimmer, the purpose of which is to remove floating debris from the liquid standing in the clarifier tank or receptacle 12. The skimmer may consist of an inclined pipe or tube having at one end a swivel connection at 62 with a riser or lift pipe 64 which depends substantially vertically from a T or elbow fitting at 66. The fitting 66 connects the riser with a substantially horizontal pipe 68 that extends from the clarifier chamber to the interior of tank 10, preferably near the open top of said tank. Pipe 68 is a redelivery tube which returns to the aeration tank 10, or to some other depository, the debris removed from the clarifier chamber by skimmer 60.

The free end 70 of skimmer 60 may be diametrally slotted as at 72, FIG. 4, for a short distance, and the bases of the slots ordinarily will be submerged in the liquid of the clarifier chamber. The line L on FIG. 1 indicates the normal level of liquid in tank 10 and receptacle 12. The skimmer tube 60 may be swung about the swivel connection at 62, to change the elevation of the intake end 70 with relation to the level of liquid in the clarifier chamber, this change of elevation being desirable under conditions which cause a change in the level at L.

At a location intermediate its ends, the skimmer tube may be provided with a perforated lug or bracket 74, which may be welded or otherwise fixed to the tube. The perforation of the lug or bracket accommodates the lower end 76 of an adjusting rod 78, with pivotal connection. The upper end of the adjusting rod carries operating means for altering the effective length of the rod, said means being shown as a turnbuckle 80 by way of example. The turnbuckle may be anchored as at 82 upon a stationary structural part 83 of tank wall 16, or upon any other fixed element of the structure.

From the foregoing, it will be understood that the intake end 70 of the skimmer may be raised or lowered relative to the liquid level L, by simply rotating the turnbuckle 80 in one direction or the other. It is important to note that the turnbuckle is conveniently accessible near the top of wall 16, and the necessary adjustments of the skimmer may be effected without subjecting an attendant to exposure to sewage or other hazards.

Means is provided for effecting a flow of liquid into the intake end 70 of the skimmer. Such means may comprise a lift associated with riser 64. By way of example, an air lift is shown comprising an air supply pipe 84 having connection at 86 with a jet or nozzle element 88 connected in the riser near its lower end. The jet or nozzle element 88 is a commercial device which establishes an upward flow within riser 64 so long as air under pressure is supplied thereto. In some instances, the medium under pressure supplied to the jet or nozzle element is a liquid, rather than a gas such as air, and it is to be understood that either a liquid or a gaseous lift may be utilized in the structure herein set forth, although an air lift is preferred. As an alternative, a suction may be established in the redelivery pipe 68 by means of a suitable pump, to effect operation of the skimmer.

In the embodiment illustrated, air is supplied to pipe 84 through a suitable control valve 90, by way of a hollow box beam 92 that forms a structural reinforcing element of the tank 10. The valve 90 may be a needle valve, if desired. Box beam 92 provides an air header which supplies air to the lift element 88, and may also serve as a source of air supply to the pipe or pipes 24 which supply the aeration nozzles 20.

What is claimed is:

1. A sewage treatment plant which comprises in combination: an aeration tank having opposite side walls, opposite end walls, and a bottom wall; a clarifier receptacle associated with said tank and having a connecting opening therein for passage of liquid between the tank and said receptacle to establish a common level of liquid sewage therein; nozzle means within the aeration tank for releasing into said liquid sewage a flow of air under pressure, said nozzle means comprising a substantially rigid plate having an edge portion, the plate having apertures therethrough spaced from the edge portion, a flexible diaphragm substantially impervious to liquid disposed on the plate in covering relationship to the apertures, the diaphragm having an edge portion, means maintaining the edge portion of the diaphragm in contact with the edge portion of the plate, and means for directing air under pressure between the plate and diaphragm and lift the diaphragm from the plate in the region of the apertures to effect release of the air through the apertures, the flow being released through the nozzle means near said bottom wall; an elongate skimmer tube having an open upper intake end and a lower end; means within the clarifier receptacle pivotally supporting the lower end of the skimmer tube, for swinging movement of said upper intake end to various degrees of inclination relative to the level of liquid sewage within the receptacle; means for moving and conveying skimmed liquid from said receptacle through the skimmer tube to a location outside said receptacle; and operating means accessible above said liquid level, for swinging the skimmer tube about its pivotal support means, to various degrees of inclination at which the level of the intake end thereof is adjustable relative to the level of liquid within said receptacle.

2. The combination as defined by claim 1, wherein said operating means comprises an adjusting rod having opposite ends mounted, respectively, upon a stationary part of the receptacle, and upon said skimmer tube intermediate the ends of the latter; and means for varying the effective length of said adjusting rod.

3. The combination as defined by claim 2, wherein the means last mentioned includes a turnbuckle on the adjusting rod located above the level of liquid within the clarifier receptacle.

4. The combination as defined by claim 1, wherein the upper intake end of the skimmer tube is slotted substantially diametrally in the direction of the lower end thereof.

5. The combination as defined by claim 3, wherein said means for moving and conveying skimmed liquid through the skimmer tube comprises a compressed air lift.

6. The combination as defined by claim 2, wherein said means for moving and conveying skimmed liquid through the skimmer tube comprises a compressed air lift, and wherein the upper intake end of the skimmer tube is slotted substantially diametrally in the direction of the lower end thereof.

7. An aeration nozzle comprising in combination: a substantially rigid plate having a perimeter margin, and opposite faces having through apertures formed therein at locations spaced from said perimeter margin; a flexible diaphragm substantially impervious to liquid disposed substantially flatwise upon one face of said plate in normal covering relationship to said plate apertures, said diaphragm having a perimeter margin; means for maintaining the perimeter margin of said diaphragm in abutment against said one face of said plate; and means for directing a gas under pressure between said plate and said diaphragm, to lift the diaphragm from the plate in the region of the plate apertures, thereby to effect release of said gas through said apertures at the remaining face of the plate.

8. The aeration nozzle as defined by claim 7, wherein the aforesaid means for directing a gas between the plate and the diaphragm includes a port opening in the plate spaced from the apertures of said plate.

9. The aeration nozzle as defined by claim 8, wherein said port opening of the plate includes a tubular nipple having one end secured to the plate about said port opening, and a second end adapted for attachment to a source of gas supply.

10. The aeration nozzle as defined by claim 9, wherein said nipple extends from that face of the apertured plate which is not covered by the diaphragm.

11. The aeration nozzle as defined by claim 7, wherein the flexible diaphragm is formed of a material of the class of resilient rubber.

12. The aeration nozzle as defined by claim 7, wherein the flexible diaphragm is formed of a material of the class of resilient neoprene.

13. The aeration nozzle as defined by claim 7, wherein the flexible diaphragm is formed of a cloth of the class of nylon impregnated with a material of the class of neoprene.

14. The aeration nozzle as defined by claim 7, wherein the flexible diaphragm is formed of a material of the class of neoprene reinforced with a lamination of substantially unstretchable flexible cloth.

15. The aeration nozzle as defined by claim 7, wherein the flexible diaphragm is formed of a rubber-like material reinforced with a cloth of substantially unstretchable flexible material.

16. The aeration nozzle as defined by claim 10, wherein the diaphragm is formed of a rubber-like material.

17. The aeration nozzle as defined by claim 10, wherein the diaphragm is formed of a rubber-like material reinforced with a substantially unstretchable flexible cloth.

18. The aeration nozzle as defined in claim 7, wherein the plate is in the form of a flat circular disc of rigid corrosion-resistant material, and the apertures thereof are arranged in a circular row and equidistant from the center of the disc; and wherein the means last mentioned includes a central port opening in the disc defined by a tubular nipple having one end fixed to the disc about the central port, and a second end projected from that face of the disc which is opposite to the diaphragm-supporting face thereof.

19. The aeration nozzle as defined by claim 18, wherein said means for maintaining the diaphragm in abutment against said one face of the plate, comprises an open ring overlying the perimeter margin of the diaphragm and a plurality of bendable hook elements on the plate normally overlying said ring and depressing said ring onto the perimeter margin of said disc-like plate.

20. The aeration nozzle as defined by claim 18, wherein the diaphragm is formed as a substantially flat disc of rubber-like material.

21. The aeration nozzle as defined by claim 19, wherein the diaphragm is formed as a substantilly flat disc of rubber-like material.

References Cited

UNITED STATES PATENTS

| 2,236,895 | 4/1941 | Court | 210—221 X |
| 3,048,339 | 8/1962 | Tapleshay | 210—221 X |
| 3,228,526 | 1/1966 | Ciabattari et al. | 210—195 X |
| 3,334,819 | 8/1967 | Olavson | 261—121 X |

J. L. DE CESARE, Primary Examiner

U.S. Cl. X.R.

210—195; 261—124